United States Patent
Adler et al.

(10) Patent No.: US 6,738,631 B1
(45) Date of Patent: May 18, 2004

(54) VISION-GUIDED MODEL-BASED POINT-AND-CLICK INTERFACE FOR A WIRELESS HANDHELD DEVICE

(75) Inventors: Mark Adler, Lexington, MA (US); Franklin Reynolds, Bedford, MA (US)

(73) Assignee: Nokia, Inc., Irving, TX (US)

( * ) Notice: Subject to any disclaimer, the term of this patent is extended or adjusted under 35 U.S.C. 154(b) by 0 days.

(21) Appl. No.: 10/138,489

(22) Filed: May 6, 2002

(51) Int. Cl.[7] .................................................. H04Q 7/20
(52) U.S. Cl. .............................. 455/456.6; 455/456.1; 455/456.3; 455/414.2; 345/326; 345/348; 340/825.29; 340/825.69
(58) Field of Search .......................... 455/412.1, 414.1, 455/414.2, 418, 456.1, 456.3, 456.6; 345/326, 348; 340/825.29, 825.69, 825.72; 348/233, 211

(56) References Cited

U.S. PATENT DOCUMENTS

| | | | |
|---|---|---|---|
| 5,929,848 A | * 7/1999 | Albukerk et al. | ........... 345/700 |
| 6,335,658 B1 | * 1/2002 | Shiratori | ..................... 329/311 |
| 6,674,993 B1 | * 1/2004 | Tarbouriech | ............... 455/2.01 |
| 2001/0034222 A1 | * 10/2001 | Roustaei et al. | ............ 455/403 |
| 2002/0044659 A1 | * 4/2002 | Ohta | ........................... 380/241 |

OTHER PUBLICATIONS

Michael Swain et al "Color Indexing," *International Journal of Computer Vision*, vol. 7(1), pp. 11–32 (1991).

* cited by examiner

Primary Examiner—William Trost
Assistant Examiner—Danh Le
(74) Attorney, Agent, or Firm—Banner & Witcoff, Ltd.

(57) ABSTRACT

Aspects of the invention overcome the problem of establishing communications with devices for which the communication protocol is unknown. One aspect of the invention involves the use of a discovery registration in which a portable device is provided with information describing the physical appearance characteristics of objects or devices that may be used to identify an object of interest. Another aspect of the invention involves the use of sensing techniques for establishing the identity of an object for which more information is sought by comparing the sensed physical characteristics of an object with data describing the physical characteristics of the objects located within an environment of the network. Aspects of the invention further involve associating the information describing the physical characteristics of objects or devices with additional information regarding the object, which may include the communication protocol for the device or object with which communication is desired.

43 Claims, 4 Drawing Sheets

VISION-GUIDED MODEL-BASED POINT-AND-CLICK INTERFACE FOR A WIRELESS HANDHELD DEVICE

FIELD OF THE INVENTION

This invention relates generally to wireless networks. More specifically, the invention relates to a wireless interface and a method for identifying an object and discovering information about the object.

BACKGROUND OF THE INVENTION

Radio-based wireless networks require the transmission of signals over a large area. To facilitate communication between a device and an intended recipient, the intended recipient must be identified so that it recognizes and acts upon signals transmitted to it from the originating device. Such transmissions must be performed using a protocol that enables communications with the intended recipient.

When a wireless device is brought into a new wireless environment, one in which the device is unfamiliar with the network devices with which it must communicate, the wireless device must be capable of determining the appropriate communication protocol necessary for communicating with each network device. Sequencing through a series of attempts to communicate via a list of known protocols would be a prohibitively inefficient method of establishing communications.

Previous solutions to this problem have been limited by the requirement that both devices employ a shared communication protocol and a shared network access media. For example, typical data transfers using handheld units may involve standard network transfers associated with desktop devices, SMS messaging via a cellular network, or short-range wireless techniques such as those employing Bluetooth techniques. Such techniques, however, require use of compatible hardware, a shared communication protocol and a predetermined repertoire of functionality.

Even when equipped with a list of protocols for the devices located in the new wireless network, it is difficult for the portable device to identify devices located in the environment. Thus, the portable device must be capable of selecting the protocol necessary for communicating with a device; without such capability communications may not be successfully established. For instance, a user may wish to instruct a printer to print an image stored in the user's portable device. Assuming the portable device includes a list of the protocols for the various computers, printers, and facsimile machines present in the environment, the particular communication protocol to be used with the device must be selected from among those listed. If there are multiple devices in the environment, the portable device must determine the identity of the particular device, a printer, and perhaps even the brand and model number for that specific printer, to select the appropriate protocol for establishing communications with that device. Should the portable device be unable to identify the specific printer and the protocol to be utilized, the portable device may be unable to establish communications with that device.

Thus, there is a need in the art to provide a simplified yet effective method for enabling a device positioned within a new wireless environment to acquire information relating to the devices or objects within that environment, such as information necessary for establishing communications with those devices.

SUMMARY OF THE INVENTION

Aspects of the invention overcome the problem of establishing communications with devices for which the communication protocol is unknown. One aspect of the invention involves the use of a discovery registration in which a portable device is provided with information describing the physical appearance characteristics of objects or devices, information that may be used to identify an object of interest. A further aspect of the invention involves the use of sensing techniques for establishing the identity of an object for which more information is sought, by comparing the sensed physical characteristics of an object with data describing the physical characteristics of the objects located within an environment of the network. Additional aspects of the invention involve associating the information describing the physical characteristics of objects or devices with additional information regarding the object, which may include the communication protocol for a device with which communication is desired.

DETAILED DESCRIPTION OF THE INVENTION

Figure 1:
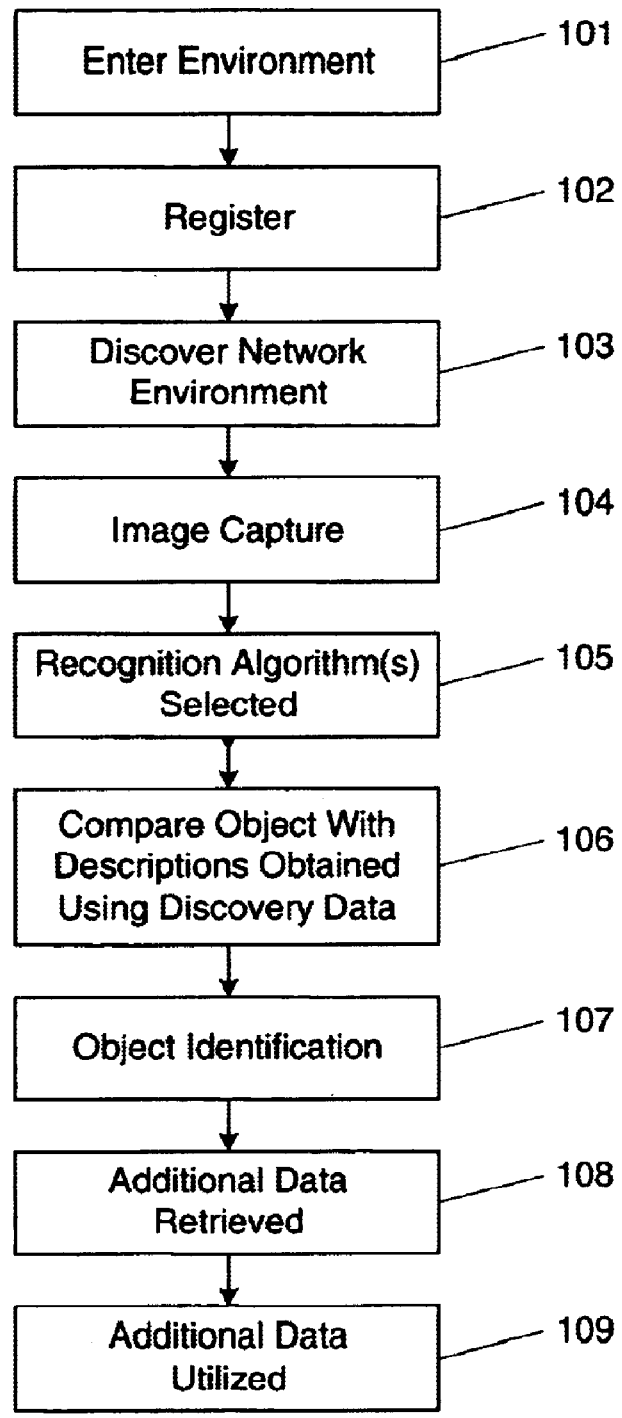
FIG. 1 shows a flow chart illustrating steps of an exemplary embodiment of a method employing various aspects of the invention.

FIG. 1 shows an exemplary embodiment of a method employing various principles of the invention. As shown in step 101 of FIG. 1, a portable device, which may include a hand-held PDA, a cellular telephone, or any transportable unit capable of communicating with other devices, first enters an environment located within a wireless network. Step 102 illustrates the step in which the portable device may establish a communication link with the network for registering with this new environment. Such establishment of a link with the network often occurs, for example, when the portable device detects a network change, i.e., the device detects that it is no longer connected to one network, then detects connection to that network or to another network.

As illustrated in step 103, the portable device may perform procedures for discovering information describing the physical appearance characteristics of the objects located within the area encompassed by the environment. This novel step of discovering information concerning the physical appearance of objects within the relevant environment may occur contemporaneously with registration, or may occur at an time prior to the time for which the descriptive data might be required in the identification process.

The step of discovering information describing the physical appearance of objects located in the environment, may be performed through a variety of methods. In one example, the portable device acquires discovery information describing physical characteristics of objects in the environment using a discovery protocol that interrogates the local network for information concerning objects that are positioned within that environment. In response to one or more queries, the network may transmit data containing information describing the physical appearance of the objects positioned within a short distance from the portable device. In that example, data representing all of the objects situated within the entire space of the network may be stored in a discovery information repository. Information pertaining to objects proximate the user may be selected from that repository, may be received by the portable device, and may then be stored in a memory of the portable device. Alternatively, the information may be loaded into a memory of the portable device prior to registering with the network, received directly from the objects, or retrieved by any other means. In a preferred embodiment, the discovery protocol is preferably one having a rich description language and rich query language for the relevant information utilized, for instance, an XML™ based protocol, such as SSDP™, or Microsoft™ universal plug and play discovery protocol, will provide the desired flexibility. Of course, variations in the protocol used depend on the characteristics or features the particular designer of the device determines to be most beneficial in the particular applications or environment in which the system will be used.

The discovery information, describing objects located within the relevant environment, may include information describing the physical appearance of those objects. For example, the information describing the physical characteristics of these objects may include size, shape, color, or any number of terms, phrases or other forms of information that might describe any aspect of the physical characteristics of objects located therein. For instance, where the relevant environment is a laboratory, objects located within that space may include testing equipment, computers, printers, facsimile machines, among many others. Information describing the physical characteristics of those objects might include outlines of the shape of each object viewed from various angles, a histogram analysis of the colors corresponding to each object, a photograph of each object, or any information conveying the observable appearance of the objects.

The discovery information may also include information concerning location or orientation of the object. Location information may be referenced by any number of techniques, including, but not limited to, GPS or the like, and/or by reference to the relative locations of other objects in the room. The specific descriptive information recited above is not intended to limit the scope of information that may be used. Indeed, any information relating to a device or other object of possible interest to a user of a portable device may be utilized consistent with the invention disclosed herein.

Once in possession of the descriptive discovery data, the object of interest may be identified. To facilitate such identification, the portable device may include a sensor, such as an image sensor, for acquiring information concerning the appearance of the object. In the image capture step of step 104, the user may point the sensing unit of the portable device in the direction of the object of interest. An image containing the desired object may be acquired using a point-and-click technique, or any technique through which sensed data may be acquired and/or selected for identifying an object.

Optionally, the user may select a portion of the captured image in order to highlight one object out of a group of objects.

As to be described in more detail below, in a preferred embodiment image recognition processing is used to identify an object and to retrieve information associated with that object for use by the portable device. Specifically, in step 105, an object recognition algorithm for use in identifying the object of interest based on its physical appearance is selected. Once selected, the object recognition algorithm may be used to compare data representing the object with discovery data describing the object, as shown in step 106. At step 107, image analysis is completed and the object is identified. At step 108, additional data for the identified object is retrieved and at step 109 the portable device operates on the additional data.

As a basic principle, the image recognition algorithm to be selected might involve a comparison of the sensed data with the set of data describing the physical appearance of objects located in the environment. If the comparisons yield a correlation between the sensed data and the discovery data sufficiently high to meet a predetermined threshold, then the image of an object can be identified. As will be discussed further below, a limitless number of algorithms may be selected to obtain desired results in accordance with the overall needs of the system. As performance and/or efficiency of image analysis techniques improve, so may the algorithms used in the invention.

Selection of the algorithm used to identify the object can be conducted in a variety of ways. The discovery information might provide an indication of the particular algorithm or combination of algorithms most suitable for identifying an object or objects located in the relevant environment. In one embodiment, the discovery information may include indicators identifying a preferred algorithm, such as a predefined histogram analysis, which might be used if the objects in the environment are easily identified based on color, as might be the case with office equipment including devices such as printers, copiers and the like. Discovery data may include a more indirect indication, such as one describing the type of objects in the environment, office equipment in the previous example, that might provide a general indication of a preferred algorithm to be selected from amongst a plurality of algorithms. Additional indicators, provided in the discovery data or otherwise, might then narrow the list of preferred algorithms to the one most suitable. For example, the discover data might indicate that the office equipment is either black, white, and/or blue, thereby eliminating complex histogram algorithms in favor of one that processes only a few data values. Alternatively, further narrowing of the preferred histogram might be accomplished by selecting the most frequently used histogram from the remaining algorithms. Thus, one or multiple indications may be used to determine a preferred algorithm for identifying an object.

Multiple layers of image analysis may also be applied to the captured image data. For example, where the object of interest is a solid white laser printer, an algorithm most suitable for detecting large blocks of a single color could be selected, such as a histogram analysis algorithm. Where image data representing both the all white printer and an all white copier are identified using the algorithm selected, but where the algorithm is unable to affirmatively identifying either, further processing may be required. In such a case, discovery data may suggest use of a second analysis technique, such as edge detection, for identifying features of the object containing edges and matching the detected features to the features described in the discovery data. As described, algorithms or combination of algorithms may be employed such that multiple layers of image analysis are applied to the captured image data.

In the previous examples, algorithm selection is performed on the basis of suggestions or indications found in the discovery data. Algorithm selection might also be influenced by an indication of the characteristics of image data to be processed, as might be detected by an initial analysis of the captured image. For example, in an initial processing step the processor might select every third pixel of the captured image and determine the content of the captured image based on an analysis of that data, and distinguish, for example, color images from those containing monochromatic data. Based on such a preliminary analysis, an image recognition algorithm that most effectively searches the captured data for monochromatic data might be selected. For example, a preliminary scan of the captured image data might reveal that much of the captured data includes varying shades of color data. Where the discovery data indicates that the objects in the environment are each white, as might be the case with the office equipment previously described, an image recognition algorithm that first removes all color data (not including data representing white pixels) before performing further processing might be selected as the preferred algorithm. Such measures may also be used to focus additional recognition steps, as previously described, if the algorithm selected does not yield accurate object identification, or should the algorithm be designed to utilize multiple layers of algorithms in combination.

Furthermore, algorithms might be selected based on overall efficiency, processing speed, or required storage for the image data indicated by the discovery data, ascertained via a preliminary analysis of the image data, or simply as a statistical analysis of previous results. User inputs may also be used to select one or more algorithms for processing the data. Also, a user may also chose to capture multiple images containing the object, and thereby provide a great deal more data for the processor to analyze. While processing efficiencies may be sacrificed by the increase, the greater amount of data increases the likelihood that the algorithm will successfully identify the object.

Thus, selection of the algorithm or algorithms employed by the processor may be influenced by signals received by the portable device, aspects of the descriptive data received, characteristics of the captured data, a statistical analysis of the use and/or effectiveness of previously selected algorithms, user inputs, or by any number of means. That notwithstanding, the preceding description of exemplary criteria for selecting an algorithm or algorithms is intended solely for purposes of illustration and is not intended to limit the scope of criteria that may be used for selecting object recognition algorithms.

Once the algorithm has been selected, the sensed or captured image data may then be processed using the object recognition algorithms, as shown in step 106. In one embodiment, the captured image data is compared to stored data representing various objects known to the device. The image recognition processing algorithm may be aided by use of the physical appearance data discovered in the discovery process and provided as discovery data. As previously described, the physical appearance data may include information pertaining to the shape, color, size, and the like, of the objects situated in the specific wireless environment in which the portable device is located. Thus, the image recognition processing may use the descriptive characteristics as comparison data to ascertain the identity of the object of interest. For example, using known image recognition techniques, the processor may identify an object by performing a comparison of details relating to shapes detected in the sensed image data with the physical appearance information describing the shape of the various objects within the environment, and searching for a match. As another example, the image processor may perform a histogram analysis on the colors found in the image data obtained using a color image sensor. A comparison of the color data with known histograms for objects in the environment (contained in the retrieved descriptive information for each object) may provide a correlation sufficient to identify an object. Of course, multiple image recognition algorithms may be utilized, alternatively, or in combination with one another.

As a further factor in the analysis, information pertaining to the location of objects within the space may be utilized. Using a GPS device, for example, the position of the portable device may be compared to information describing locations of the objects positioned within the environment, and the results of the comparison used as a factor in determining the identity of an object. Similarly, where multiple objects are captured, either in the same image or in successive images or the like, relative location information may be utilized in the above location comparison steps. For instance, where the image contains data relating to two objects, and the distances between or relative locations of those objects can be determined, a comparison of that information with the descriptive data, describing the location of the objects, may provide sufficient information to identify the object of interest.

Furthermore, directional information may also be used to assist in the identification process. For example, using known location techniques, the location of the portable device and its orientation within the space of the environment can be determined. This relative location and orientation data may be compared with the data describing the location of the objects, and used in the analysis to determine the identity of the object captured by the portable device and its associated image sensing unit.

At step 107, the object of interest is identified. At step 108 additional data associated with the identified object is retrieved. At step 109 the portable device operates upon the retrieved additional data. Where the identified object is a printer, for example, the additional information may identify the protocol necessary for communicating with the printer. At step 109, the portable device may execute applications for establishing communications with and/or for interacting with the object. For example, the user may recall a document from memory and, using the protocol for that printer, transmit the document to the printer along with a command to print that document. Similarly, in a case where the device is an overhead projector, the user may transmit slides to be used in a presentation, then may control projection of the slides using the portable device to transmit instructions to the projector.

In yet another example, the portable device may be used in a museum setting. In this example, the descriptive information may include physical appearance information for objects located in the museum. The additional data associated with the descriptive information may, for example, include a detailed description of the artist or of the techniques used to produce the work, or information concerning its price, or links to such information. Of course, the description of a work of art as an object to be described, and the listing of the particular information associated with that object is intended merely for descriptive purposes, and is not intended to limit the scope of the objects or information utilized.

A preferred embodiment of the invention described in FIG. 1 has been provided for purposes of illustration only, and although steps 101–109 were specifically described, as previously discussed, variations of those steps, including their modification, deletion, or the provision of additional steps are well within the scope of the invention. For example, the user may also aid the image identification associated with steps 104–107.

Figures 2, 3:
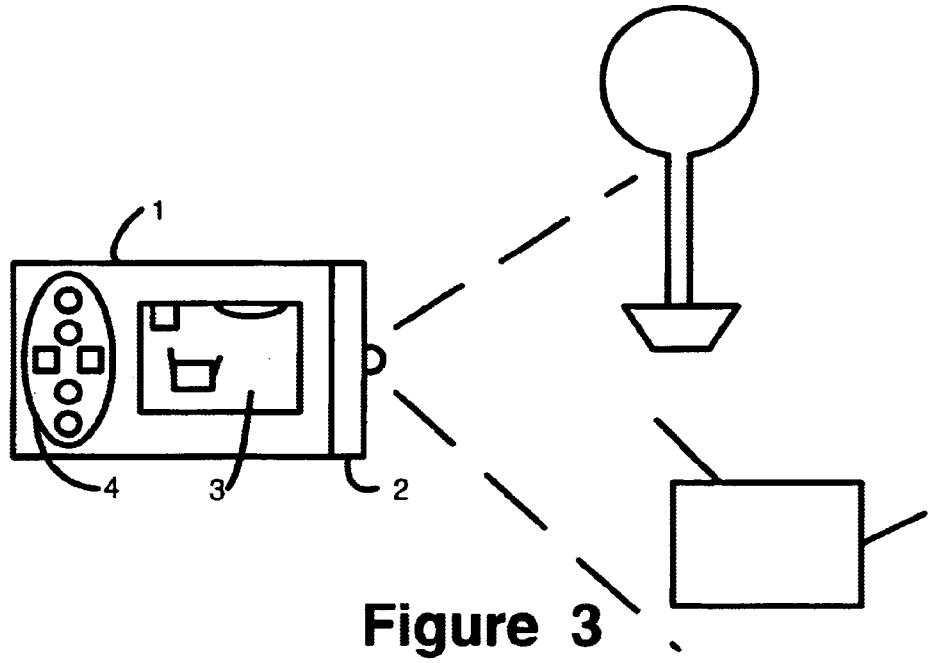
FIG. 2 is a chart illustrating one possible configuration for storing data corresponding to the objects of interest in accordance with an exemplary embodiment of the invention.
FIG. 3 shows one example of a portable device that may be used in conjunction with various aspects of the invention.

FIG. 2 illustrates the storage of discovery data for a few of the objects recited in the previous examples. In the figure, data describing the physical appearance of a laser printer, a grayscale monitor, and a work of art are stored. Discovery data including physical appearance information corresponding to such objects may include terms descriptive of shape, color, and location, as in this example. As further illustrated, discovery data may include additional information concerning the objects, such as the relevant protocols necessary for establishing communications with the device, a URL for providing a link to a web site where a further description of the item can be found, or even the price of a work of art.

As shown in FIG. 3, the portable device 1 may include a sensor 2, a display 3, and an input unit 4. Sensor 2 may comprise a video camera, still image camera, a thermal unit, an X-ray device, an ultrasonic unit or any number of sensors from which sensed data representing physical appearance characteristics of an object may be obtained. Display 3 may comprise an LCD display, touchscreen display, or other display device. Input unit 4 may be comprised of an alphanumeric keypad, adaptable keyboard, input pen for use in combination with a touch-screen display, or any input device. Using an input, such as a touchscreen and pen, the user may identify a subset of image data within the area of view of the sensor 2. For example, where the printer is the object of interest and the captured image of the environment includes a printer and another object, the user may wish to have the image recognition processing perform processing only on the data containing the object of interest, the printer. In that case, viewing the captured image on the display of the portable device, the user may draw a box around the image of the printer with an input pen, thereby avoiding much of the unnecessary data. With only a small amount of image data remaining, and most of that encompassed by the printer, object recognition would be simplified.

Such selection would facilitate object identification by limiting the amount of data undergoing analysis to only the selected data. The image to be captured, or the captured image, may be displayed on a display 3 of the portable device. Prior to processing, or after an unsuccessful processing step, the user may indicate, using a touch screen or the like, the area of interest within the image captured by the image sensor, for further processing using a selected algorithm. The user of the portable device may also modify the image to be captured by the sensor using inputs to the portable device or to the sensor, as might be accomplished by activating as a zoom feature.

Similarly, the image identification algorithm employed may also provide for user selection of the object. For example, where the object cannot be identified using the selected algorithm, an alternate method of identification can be utilized. For instance, assuming the algorithm is unable to determine the exact identity of the image of a printer, but can through elimination or otherwise, discriminate that the object: of interest is one of four printers for which it has stored appearance information, representations of the objects located within the relative environment might be displayed to the user for his or her selection from amongst those images. Thus, based on a partial success of the algorithm, the comparisons may provide a subset of the entire list of objects in the environment from which the identity of the object of interest may be selected. Moreover, the user may be afforded the option of sorting through the remaining description data using a display. For example, lists of the descriptive data corresponding to the objects may be provided, whether the descriptive information consists of text identifying the object and/or its characteristics, representations of the objects, or any other unique identifiers. As a result, a user may scroll through the various lists making his or her way through selection of the components of the descriptive data until arriving at the identity of the object. As a further example, the user may select the shape of the object as rectangular, eliminating all other identities from the list. Next the user may select from the accessories list a description indicating that the object has paper trays. Next the user may select the color white, eliminating all other identities that remain for which the color data is not described as being comprised of more than 50% white. From that selection, the identity of the white printer may be verified. Accordingly, object identification may be enhanced via user inputs.

Similarly, where multiple objects are included within the field of view of the image sensing unit, resort to alternative factors, beyond those provided via the discovery data, might be used to determine the object of interest for which identity is sought. In a point-and-click system, the analysis may be set such that the object located closest to the center of the image is determined to be the object of interest for which further identification is sought. As yet another alternative input, the user might point the portable device toward an object, capture an image, extend his or her arm toward the object and capture another image. In this exemplary algorithm, the device performs a comparison of these two images to determine the object appearing in both and/or the object that, on average, is determined to be closest to the center of the image. Of course, an unlimited number of image processing and recognition techniques could be used consistent with the spirit of the various aspects of the invention.

To illustrate, typical image processing techniques might rely on image features such as color (e.g., a color histogram); shape (e.g., spline contour matching or template matching); texture; or any other measure that might prove useful for identifying an object in a particular context. Many color-based retrieval systems use versions of a color histogram that has proven useful in characterizing the color content of the image as a whole. See, e.g., Michael Swain and Dana Ballard, "Color Indexing," *International Journal of Computer Vision*, 7(1): 11–32, 1991. The frequent use of color histograms for image comparison is due to the fact that: (1) color histograms are quick and easy to compute, (2) small changes in the point of view do not cause large variations in the histogram, and (3) different objects usually have significant differences in their histogram representations. Thus, algorithms involving color histograms are one suitable technique for analyzing the data to identify an object from the sensed data. As noted, however, identification of color features is one of a variety of algorithm types that may be used. Other techniques include those involving template matching, a comparison of a transform of an image, or any algorithm or combination of algorithms useful in identifying an object within sensed data. Furthermore, algorithms for analyzing a collection of features and performing a comparison of any set of extracted features are also within the scope of the present invention.

Figure 4:
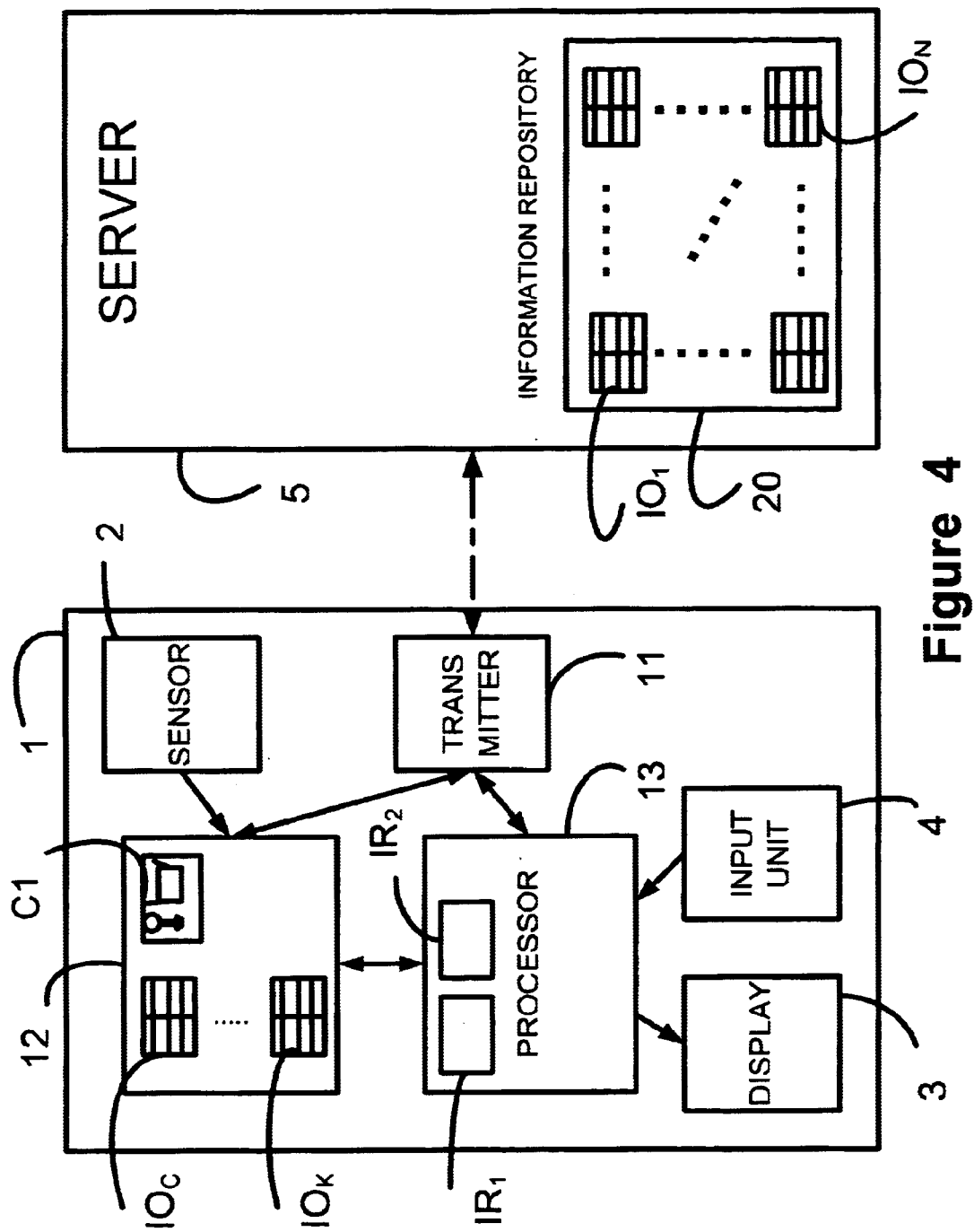
FIG. 4 shows one possible configuration of a system in accordance with a preferred embodiment of the invention.

FIG. 4 shows a system illustrating various aspects of the invention. Information pertaining to the objects in the local environment may be stored in memory 20, the INFORMATION REPOSITORY, of the server 5 of the wireless network encompassed by the area in which the portable device is positioned. The information may include, among other things, a description of each of the objects to be identified, $IO_1$–$IO_N$. Using transmitter 11, the portable device 1 discovers, receives from the server in this example, information concerning the object or objects that are positioned in the environment in which it is currently located, $IO_C$–$IO_K$. The information is then stored in memory 12 of the portable device 1. Although the discovery information may be obtained at any time prior to identification processing, in this exemplary embodiment the sensor 2 next captures a selected image C1, and that image may be stored and/or transmitted to the processor 13 for analysis. Using one or more image analysis algorithms executed by the processor 13, $IR_1$ and $IR_2$, each of which may be comprised of a set of instructions stored in memory, the image may be identified. If user interaction with the portable device is desired, as described above, to assist in the identification or for any other purpose, a display 3 and/or input unit 4 may be included with or in the portable device. Upon a successful identification, data corresponding to the identified object may be retrieved and may be utilized in conjunction with a relevant application. While image data has been described in this example as the data processed, any type of sensed or otherwise input data may be processed.

Figure 5:
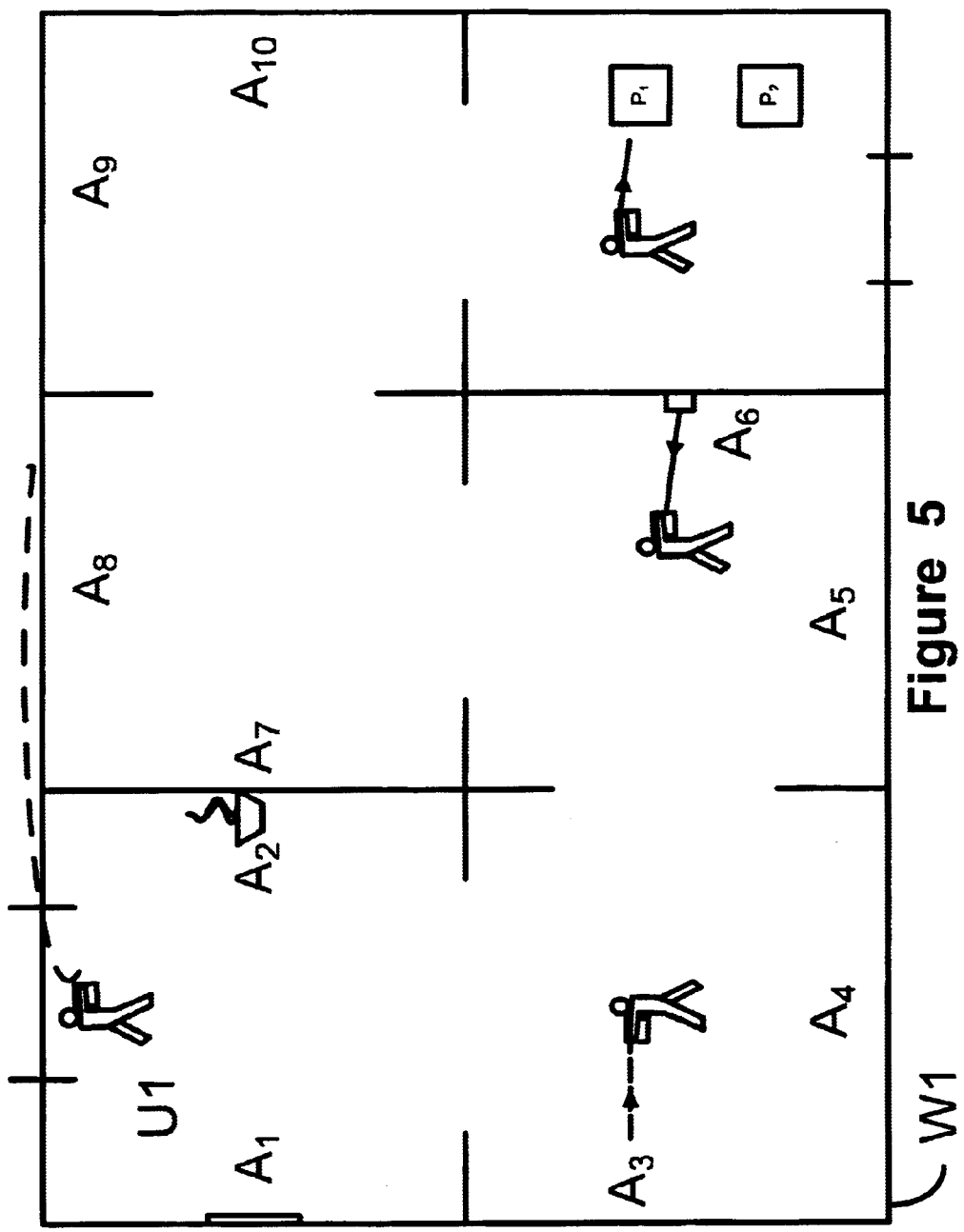
FIG. 5 shows an example of an environment in which an exemplary embodiment of the invention may be employed.

FIG. 5 shows an example of an environment in which an exemplary embodiment of the invention may be employed. Once a user U1 enters the wireless environment W1, in this example one encompassing an entire floor of a museum, the portable device may establish communications with the wireless network. At that time the portable device may register with the network, in response to manual inputs or automatically. The device may also receive from the network discovery information describing the objects within the environment W1, such as the various paintings (A1) or bronze sculptures (A2) depicted. Entering the second exhibit on that floor, the user U1 may find the artwork (A3) interesting and seek to learn more about that work of art. The user U1 points the sensor 2 of the portable device at the object (A3) and captures an image containing the object. The portable device might perform the necessary steps to identify the object, using information identifying that object, such as color, or shape or size. If the object is a painting, the information identifying the object might be the predominant background color of that particular painting, if different from the rest. Once identified, the user U1 may seek to review information describing the art in detail, store information necessary for its purchase, or access a link to a related web site on the Internet. The process may be repeated any number of times as the user U1 wanders through the exhibits. Should the user U1 wish to print out the detailed description, or even order a print of the work, the user U1 may wish to interact with a printer P1 or P2 located in the exhibition, as shown in FIG. 5. Printers may be stationed such that a user U1 can point the sensor at the unfamiliar printer, capture its image, identify the printer, retrieve its protocol information as additional information, and send a print or copy order to the printer.

In an exemplary embodiment, works of art were identified as objects that do not include transmission or reception capabilities. In that embodiment, the portable device receives from the network the discovery data. Alternatively, proxy units or software in the network serving as proxies for those objects may also be utilized to transmit, receive or store any data desired. For example, a unit may be positioned near a work of art, and when that work of art is identified, the protocol for that unit may be extracted from the stored additional information. As a result, the portable device may communicate with the unit associated with the work of art and information not stored in the repository, such as an extended description of the origin of the work of art or updated pricing information, may be transmitted to the portable device. Reference to works of art as objects that do not include transmission capabilities is merely illustrative. Thus, any object that may be identified and sensed falls within the scope of the present invention.

Of course, any number of devices for communicating over a wireless network could be employed in place of the hand-held PDA, including the above mentioned cellular telephone, Bluetooth, 802.11, or any other means. Furthermore, while the previous embodiment was described with respect to an environment encompassing an entire wireless network, the system may be used within an environment encompassing any subset of an entire network, or any environment similar to such environments.

In the exemplary embodiment, information concerning the objects located within the area encompassed by the environment is received over the network. Alternatively, the data may be uploaded from a docking station or added via a memory card or the like. Additionally, the descriptive information may be broadcast from the objects themselves. Descriptive information and meta-information may also be obtained form other individuals. For example, in the museum example, visitor U1 may have recorded an interest in obtaining a print of a specific work of art. A second visitor might use that information to purchase a print.

While the sensed data, discovery information, additional information, and processing algorithms were illustrated as being stored in particular locations within the portable device, such information or processing algorithms may be stored in any location within or external to the device while not departing from the spirit of the invention. For example, various data and processing algorithms may be stored on a smart card and interchangeably inserted into the device for use by the device.

While an exemplary embodiment described use of a touchscreen display, any suitable display and input system may be used. Moreover, a display is only necessary to the extent the particular functions described are to be included. For example, a viewfinder may be used in place of or in combination with the display. Furthermore, should there be no use or desire for review of the image, no previewing unit would be necessary to achieve many of the aspects of the invention described above. Additionally, voice commands may be utilized in place of or as a supplement to such alternative inputs.

While an exemplary embodiment described use of a GPS system for determining location information, the invention is not so limited. Indeed, location information may be obtained using any number of techniques including, but not limited to, cellular location, or MIT's Cricket™ beacons.

We claim:

1. A portable device capable of communicating within an environment, comprising:
    a processor;
    a communication interface;
    a sensor that obtains sensed image data representing the actual physical appearance characteristics ol an area of interest within the environment; and
    a memory containing discovery data comprising physical appearance characteristics of objects located within the environment and additional data concerning the objects located within the environment;
    wherein the processor performs steps of retrieving from the memory discovery data comprising physical appearance characteristics of objects located within the environment and searching the sensed image data for data corresponding to the retrieved discovery data.

2. The portable device according to claim 1 wherein the discovery data further includes data describing the location of the objects.

3. The portable device according to claim 1 wherein the communication interface receives the discovery data wirelessly.

4. The portable device according to claim 1 wherein the communication interface receives the discovery data from a memory card on which the discovery data is prestored.

5. The portable device according to claim 1 wherein the communication interface receives the discovery data from objects located within the environment.

6. The portable device according to claim 1 wherein the portable device comprises a mobile telephone.

7. The portable device according to claim 1 wherein the portable device comprises a personal digital assistant.

8. The portable device according to claim 1 wherein the portable device comprises a laptop computer.

9. The portable device according to claim 1 wherein the processor performs object recognition on the sensed image data to identify one or more objects located in an area from which the sensed image data was acquired.

10. The portable device according to claim 1 wherein the processor processes a subset of the sensed image data in response to a user indication input to the portable device selecting only a subset of sensed image data to be processed.

11. The portable device according to claim 1 wherein the processor performs object recognition on the sensed image data using at least a portion of the discovery data.

12. The portable device according to claim 1 wherein based on the discovery data the processor identifies an object in the sensed image data by comparing features in the sensed image data to the physical appearance characteristics of the objects described in the retrieved discovery data.

13. The portable device according to claim 1 wherein based on the discovery data the processor identifies an object in the sensed image data using a set of instructions that perform color histogram analysis.

14. The portable device according to claim 1 wherein based on the discovery data the processor identifies an object in the sensed image data using a set of instructions that perform image analysis, wherein the image analysis includes edge detection.

15. The portable device according to claim 1 wherein based on the discovery data the processor identifies an object in the sensed image data using a set of instructions for analyzing the sensed image data selected from among a plurality of sets of instructions.

16. The portable device according to claim 1 wherein based on the discovery data the processor identifies an object in the sensed image data using a set of instructions for analyzing the sensed image data selected from among a plurality of sets of instructions, wherein the selection of the set of instructions is performed based on the discovery data.

17. The portable device according to claim 1 wherein based on the discovery data the processor identifies an object and communicates with the object using a communication protocol described in the discovery data.

18. The portable device according to claim 1 further including a display that displays the additional data concerning the objects located within the environment.

19. A method of identifying an object, comprising the steps of:

retrieving discovery data describing physical appearance characteristics of objects within an environment, wherein the discovery data further includes additional data concerning the objects located within the environment;

acquiring, using a sensor associated with the portable device sensed image data representing the actual physical appearance characteristics of an area of interest within the environment; and searching the sensed image data for data corresponding to the retrieved discovery data.

20. The method according to claim 19, wherein the step of retrieving discovery data further comprises the step of:

receiving the discovery data as a wireless communication.

21. The method according to claim 19, wherein the step of retrieving discovery data further comprises the step of:

receiving the discovery data from a detachable memory on which the discovery data is prestored.

22. The method according to claim 19, wherein the step of retrieving discovery data further comprises the step of:

receiving the discovery data from a memory card on which the discovery data is prestored.

23. The method according to claim 19, wherein the step of retrieving discovery data further comprises the step of:

receiving the discovery data from the objects located within the environment.

24. The method according to claim 19, wherein the step of acquiring sensed image data further comprises the step of:

capturing image data of an area within the environment.

25. The method according to claim 19, wherein the step of searching the sensed image data further comprises the step of:

identifying an object in the sensed image data using a set of instructions that perform image analysis for comparing features in the sensed image data to the physical appearance characteristics of the objects described in the retrieved discovery data.

26. The method according to claim 19, wherein the step of searching the sensed image data further comprises the step of:

performing image analysis on the sensed image data using a set of instructions selected from among a plurality of sets of instructions.

27. The method according to claim 26, wherein the step of conducting image analysis on the sensed image data comprises the step of:

comparing information contained in the discovery data with the sensed image data.

28. The method according to claim 19, wherein the step of searching the sensed image data further comprises the step of:

identifying an object using physical characteristics of the object contained in the retrieved discovery data.

29. The method according to claim 19, wherein the step of searching the sensed image data further comprises the step of:

identifying an object using information relating to the location of the object contained in the retrieved discovery data.

30. The method according to claim 19, wherein the step of searching the sensed image data further comprises the step of:

searching a subset of the sensed image data.

31. The method according to claim 30, wherein the step of searching a subset of the sensed image data further comprises the step of:

searching a subset of the sensed image data on the basis of a user selection input to the portable device.

32. The method according to claim 19, wherein the step of searching the sensed image data further comprises the step of:

identifying the object on the basis of a color histogram analysis.

33. The method according to claim 19, wherein the step of searching the sensed image data further comprises the step of:

identifying the object on the basis of an analysis utilizing edge detection.

34. The method according to claim 19, comprising the additional step of:

retrieving additional data comprising an identified object for establishing communications with the object, based on the results of the search.

35. The method according to claim 19, comprising the additional step of:

retrieving additional data comprising an URL associated with the object, based on the results of the search.

36. The method according to claim 19, comprising the additional step of:

providing a display of the additional data corresponding to an identified object.

37. The method according to claim 19, comprising the additional step of:

executing an application utilizing the additional data corresponding to an identified object.

38. The method according to claim 19, comprising the additional step of:

performing steps to facilitate communication between the portable device and the object using additional data corresponding to an identified object.

39. A method of identifying an object, comprising the steps of:

locating a portable device within a wireless network;

wirelessly receiving discovery data describing physical characteristics of objects within the environment of the wireless network, wherein the discovery data includes additional data concerning the object or objects located within the environment, capturing image data representing an area within the wireless communication network using an image sensing unit;

comparing the captured image data to data corresponding to the retrieved discovery data using at least one set of instructions;

identifying an object in the captured image data;

retrieving the additional data associated with the identified object, and utilizing the additional data to communicate with the identified object.

40. A portable device comprising:

a processor;

a wireless communication interface;

a memory;

an image sensor that captures image data, wherein the processor is programmed with computer instructions that perform the steps of:

(1) receiving from the wireless communication interface discovery data comprising physical appearance characteristics for a plurality of objects located within a wireless network in which the portable device is operating and including additional data pertaining to each of the plurality of objects;

(2) storing the received discovery data in the memory; and (3) processing image data captured from the image sensor and identifying one of the plurality of objects as an object of interest based on a comparison between the image data captured from the image sensor and the physical appearance characteristics stored in the memory.

41. The portable device according to claim 40, wherein the discovery data comprises information identifying an object recognition algorithm that should be used to identify one or more of the plurality of objects, and wherein the processor performs step (3) by executing an object recognition algorithm identified in the discovery data.

42. The portable device according to claim 40, wherein the discovery data comprises information identifying a communication protocol that should be used to communicate with one or more of the plurality of objects, and wherein the processor performs the further step of communicating with the object of interest using the communication protocol identified in the discovery data.

43. The portable device according to claim 40, further comprising:

a display for displaying additional data pertaining to the object of interest.

* * * * *